A. F. VICTOR.
PICTURE RECORD FOR DISPLAY MACHINES.
APPLICATION FILED JAN. 13, 1912.
1,096,873.
Patented May 19, 1914.
2 SHEETS—SHEET 2.
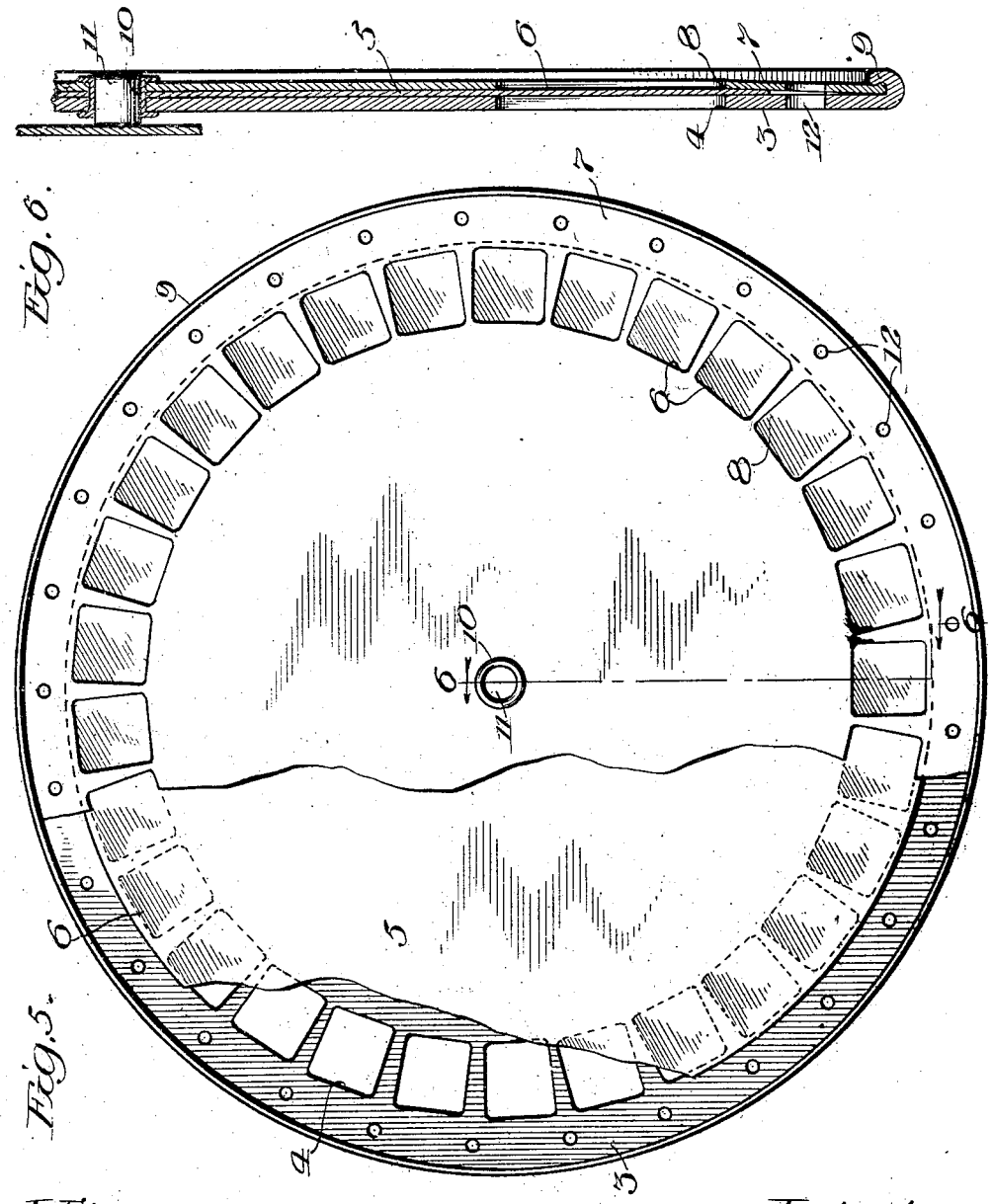

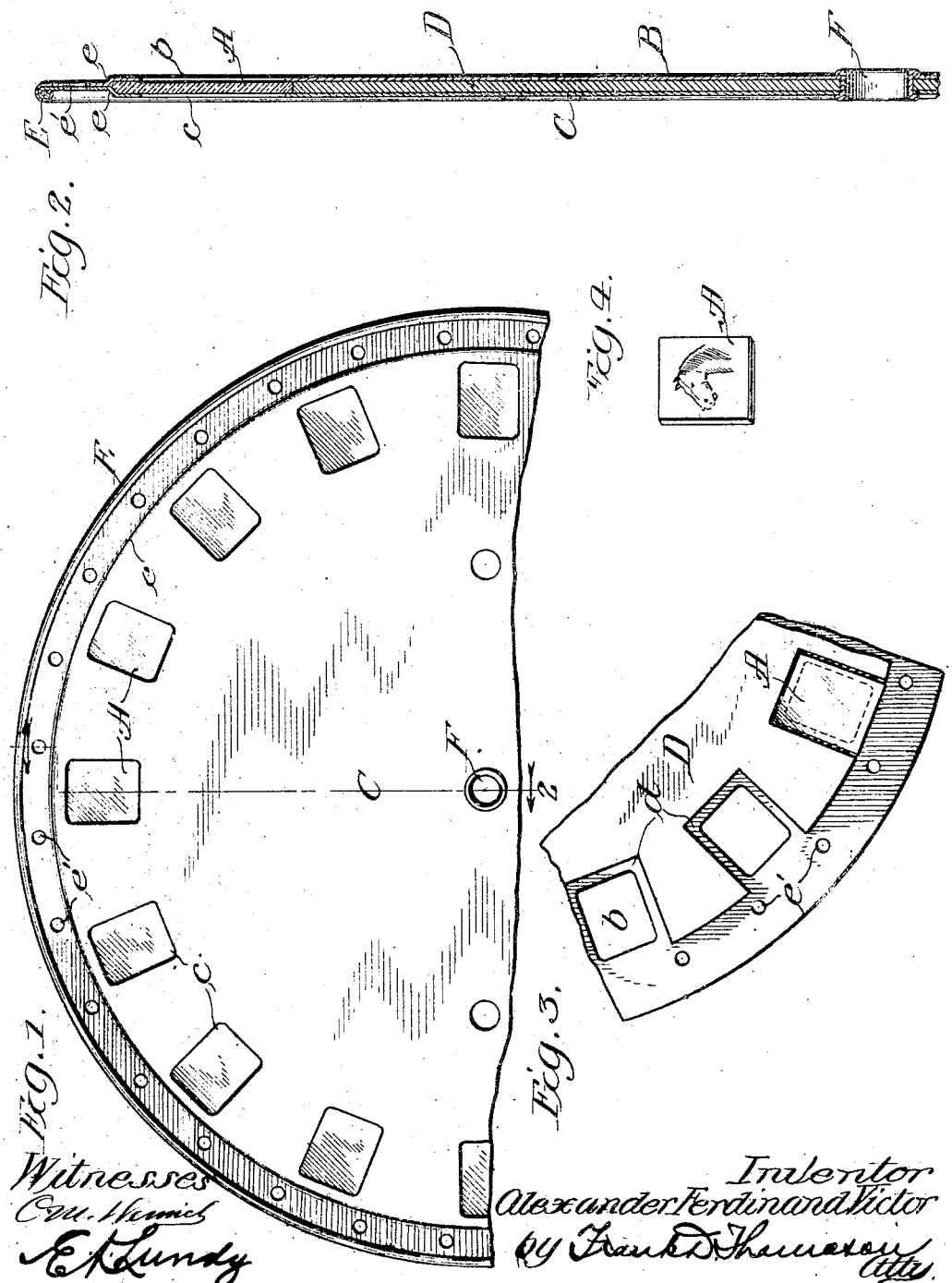

UNITED STATES PATENT OFFICE.

ALEXANDER FERDINAND VICTOR, OF DAVENPORT, IOWA.

PICTURE-RECORD FOR DISPLAY-MACHINES.

1,096,873. Specification of Letters Patent. Patented May 19, 1914.

Application filed January 13, 1912. Serial No. 671,042.

*To all whom it may concern:*

Be it known that I, ALEXANDER FERDINAND VICTOR, a subject of the King of Sweden, but having declared my intention of becoming a citizen of the United States, residing at Davenport, in the county of Scott and State of Iowa, have invented new and useful Improvements in Picture-Records for Display-Machines, of which the following is a full, clear, and exact description.

My invention relates to picture records for display machines such as kinematographs, stereopticons, and similar apparatus for projecting pictures and the like upon a screen. Its object is to provide means for protecting the pictures from abuse to which it may be subjected and thus greatly add to its longevity.

It is also an object of my invention to provide a record which is simple and durable in construction; which is so compact that a great number of the same may be packed and shipped within a comparatively small space; and which is so inexpensive to manufacture that it can be profitably sold to the user at a comparatively small cost and thus be within the reach of persons in ordinary circumstances.

Still another object of my invention is to construct a picture record that is particularly well applicable to a moving-picture machine, for the use of children and others as a toy or educational appliance. This I accomplish by the means and in the manner hereinafter fully described and as more particularly pointed out in the claims, reference being had to the accompanying drawings, forming a part of this specification, wherein, Figure 1 is a top plan view of half of one of my improved records. Fig. 2 is a central transverse section thereof taken on line 2—2, Fig. 1, and drawn to an enlarged scale. Fig. 3 is a plan view of a fragmentary portion of a record showing the back layer broken away to disclose the relative arrangements. Fig. 4 is a detail view of one of the pictures removed from the record. Fig. 5 is a plan view of a modified record, in which a flat film disk is used. Fig. 6 is a transverse section taken on line 6—6, Fig. 1, and drawn to an enlarged scale.

Referring to the drawings A represents a plurality of miniature picture bearing transparencies that are preferably made of glass, crystal, or the like. This picture is very small and to successfully display or project the same it becomes necessary to mount the transparency in some efficient manner in order that it may be passed through the machine. I have devised the following novel means for mounting and protecting the transparencies as will hereinafter more fully appear: This mounting preferably comprises a suitable metallic plate B that forms the frame or foundation of my improved record, and which is substantially circular in outline, and near its periphery is provided with a continuous series of concentrically arranged rectangular shaped picture openings $b$ at equal distances apart. These openings are preferably of the same dimensions as the pictures on the transparencies A, and they are arranged so that their longitudinal diameters are radial from the center of the disk and their longitudinal and transverse boundaries are parallel or at right angles thereto. This plate is of such diameter and the openings so arranged that the picture transparencies will register with the focal axis of the projecting machine when the record is placed therein and operated in connection therewith. When the picture transparencies have been properly placed upon the plate B and the pictures brought into register with the picture-openings $b$, a suitable circular back-plate or retaining disk C is placed over the opposite side thereof in such manner that the series of concentric picture-openings $c$ in this latter plate will register therewith. This retaining disk is preferably of metal of the same diameter as plate B and the openings $c$ therein correspond in number, dimensions and arrangement with the openings $b$ of the first described plate B. In order to keep the transparencies properly spaced apart between the plates B and C, I prefer to insert a filler D between said plates the edge of which is provided with a series of rectangular-shaped recesses $d$ corresponding and alining with the picture openings. This filler is preferably made of straw-board or the like about the same thickness as the transparencies and its outer edge is substantially the same distance from the center of the disks as the outer edges of the transparencies. When assembled in the manner described, the edges of the front and back plates are preferably rolled back upon themselves to form a circumferential bead or reinforcement selvage E extending entirely around the edge of the same, and the portions of the plates between said bead and the outer edges of the transparencies are compressed tightly together to form shoulders e, e, and firmly hold the transparencies in position. Suitable perforations e' are placed in this space for intermittently moving the record past the projecting plane, a distance corresponding to that between the centers of said perforations, and a mounting opening F is placed in the center of the record.

Referring to Figs. 5 and 6 of the drawings, 5 represents a transparent picture film, that is preferably circular in shape and is provided near its circumferential edge with a series of equi-distant pictures 6, that it is desired to display. This film is usually made of a gelatinous composition and is very flimsy and flexible, and, therefore, liable to buckle or become too distorted to be employed by itself in an apparatus of the type above mentioned. In order to overcome this disadvantage, I prefer to reinforce the same by a suitable metallic plate 3, which in the preferred form is provided with a continuous series of equi-distant picture-openings 4. These openings preferably register with the pictures on the film, in the same manner as in the preferred form just described, and plate 3 is slightly greater in diameter than the film, and, when the latter has been placed upon it and the pictures brought into register with the picture-openings 4, a suitable circular back or retaining disk 7 is placed over the side of the film opposite the plate. This retaining disk is preferably of bristol or fiber-board (or may be of metal), and is approximately of the same diameter as the plate 3 and it is likewise provided with a series of openings 8 that register with the film pictures and the openings 4 in the plate. After the plate 3, the picture-film 5, and the retaining plate or disk 7 have been properly assembled one upon the other in the order named, the edges of the plate and disk are preferably rolled back upon themselves to form a circumferential bead or reinforcement 9 extending entirely around the edge of the same as shown in Fig. 6 of the drawings.

At the center of the record it is provided with an opening 10, that is reinforced by an eyelet to bind its edges and to provide for the insertion of a suitable spindle 11 of the picture displaying machine, and it is also provided with a series of equi-distant concentric apertures 12 that extend through the plate, film and disk.

In operation, the record is mounted on the spindle of the machine and is then rotated by means of a suitable "pick" or other suitable device of the display machine hereinbefore referred to. This "pick" enters apertures *seriatim* and rotates the record upon its axis a distance sufficient to bring the pictures back of the projecting lens in successive order. As this latter feature is fully set forth and described in U. S. Letters Patent No. 1,019,951, dated March 12, 1912, it needs no detailed description herein.

What I claim as new is:

1. A record for display machines comprising a plate, a backing, a plurality of pictures interposed between the same, and a series of perforations passing through said record, between the edges of said record and said openings.

2. A record for display-machines comprising an integral disk-shaped plate having a concentric series of openings therein, a correspondingly shaped backing having a concentric series of openings in register with said first-mentioned openings, and a plurality of pictures of larger dimensions than said openings interposed between said plate and backing.

3. A record for display-machines comprising a circular plate, a circular backing therefor, a plurality of transparencies interposed between said plate and backing, and a disk-shaped filler of less diameter than said plate interposed between the inner edges of said transparencies and the center of said plate.

4. A record for display-machines comprising a circular plate, a circular backing therefor, a plurality of transparencies interposed between said plate and backing, and a disk-shaped filler of less diameter than said plate interposed between the inner edges of said transparencies and the center of said plate having a plurality of recesses in which said transparencies are retained.

5. A record for display-machines comprising a circular plate having a plurality of openings therein, a circular backing therefor having a plurality of openings therein that register with said first-mentioned openings, a plurality of transparencies interposed between said plate and backing and filling said openings, and a filler of less diameter than said plate interposed between the inner edges of said transparencies and the center of said plate.

6. A record for display-machines comprising a circular plate having a plurality of openings therein, a circular backing therefor having a plurality of openings therein that register with said first-mentioned openings, a plurality of transparencies interposed between said plate and backing and filling said openings, and a disk-shaped filler of less diameter than said plate interposed between the inner edges of said transparencies and the center of said plate having a plurality of recesses in which said transparencies are retained.

7. A record for display machines comprising a circular plate, a circular backing therefor, a plurality of transparencies interposed between said plate and backing, a filler between the inner edges of said transparencies and the center of said plate, and a concentric series of perforations extending through said record between the edge thereof and said openings.

8. A record for display-machines comprising a circular plate, having a plurality of openings therein, a circular backing therefor having a plurality of openings therein that register with said first-mentioned openings, a plurality of transparencies interposed between said plate and backing and filling said openings, a filler between the inner edges of said transparencies and the center of said plate, and a concentric series of perforations extending through said record between the edge thereof and said openings.

In witness whereof I have hereunto set my hand this 8th day of January, 1912.

ALEXANDER FERDINAND VICTOR

Witnesses:
L. PARKER,
S. G. ROSE.

Copies of this patent may be obtained for five cents each, by addressing the "Commissioner of Patents, Washington, D. C."